United States Patent [19]
Matsushima et al.

[11] Patent Number: 5,161,496
[45] Date of Patent: Nov. 10, 1992

[54] FUEL INJECTION SYSTEM FOR INTERNAL COMBUSTION ENGINES

[75] Inventors: Seiya Matsushima; Yukio Sugimoto; Ryuichi Kimata; Ryhei Tamamoto; Megumi Tanaka, all of Wako, Japan

[73] Assignee: Honda Giken Kogyo Kabushiki Kaisha

[21] Appl. No.: 713,133

[22] Filed: Jun. 10, 1991

[30] Foreign Application Priority Data

Jun. 11, 1990 [JP] Japan .................. 2-153182

[51] Int. Cl.$^5$ .................. F02N 5/02; F02M 37/04; F02P 1/02
[52] U.S. Cl. .................. 123/185.3; 123/508; 123/599; 123/149 D; 123/478
[58] Field of Search .................. 123/478, 185.3, 185, 123/185 BA, 149 C, 149 D, 417, 476, 480, 599, 149 R, 472, 185 A

[56] References Cited
U.S. PATENT DOCUMENTS

| | | | |
|---|---|---|---|
| 4,160,435 | 7/1979 | Sleder | 123/149 D |
| 4,261,437 | 4/1981 | Zavatkay et al. | 123/185 BA |
| 4,727,851 | 3/1988 | Orova | 123/149 C |
| 4,873,962 | 10/1989 | Safranek | 123/149 R |
| 4,892,079 | 1/1990 | Umezu et al. | 123/149 C |
| 4,924,831 | 5/1990 | Piteo et al. | 123/417 |
| 4,951,625 | 8/1990 | Okuda | 123/599 |

Primary Examiner—Tony M. Argenbright
Assistant Examiner—Thomas N. Moulis

[57] ABSTRACT

A fuel injection system for an internal combustion engine comprises at least one fuel injection valve for supplying fuel into the intake passage of the engine, an electronic control unit responsive to operating conditions of the engine for controlling a time period over which the fuel injection valve is opened and timing for opening the fuel injection valve, a generator responsive to rotation of a flywheel for generating electric power, the generator being connected to an ignition device and the electronic control unit and forming power supplies for driving the ignition device and the electronic control unit, a fuel pump arranged to be driven in unison with the flywheel by torque transmitted from the flywheel, and a pressure regulator for controlling pressure of fuel supplied from the fuel pump to the fuel injection valve.

8 Claims, 2 Drawing Sheets

FUEL INJECTION SYSTEM FOR INTERNAL COMBUSTION ENGINES

BACKGROUND OF THE INVENTION

This invention relates to a fuel injection system for an internal combustion engine for supplying fuel to an intake system thereof, and more particularly to an electronically-controlled fuel injection system of this kind which is adapted for use in small-sized engines equipped with no battery.

An electronically-controlled fuel injection system for an internal combustion engine is conventionally known, which comprises fuel injection valves arranged in an intake system, and control means for controlling a time period over which the fuel injection valves are opened in accordance with operating conditions of the engine.

Such a conventional electronically-controlled fuel injection system requires the use of a battery for supplying electric power thereto for driving, fuel injection valves, a control circuit for controlling the valves, and a fuel pump. Therefore, the conventional electronically-controlled fuel injection system cannot be used in small-sized engines which are equipped with no battery (hereinafter referred to as "batteryless engines" unless otherwise specified).

Under the circumstances, it has been proposed e.g. by Japanese Provisional Patent Publication (Kokai) No. 63-93440, to utilize output power from a generator driven by an engine for electronically controlling fuel supply to the engine, during operation thereof. However, insofar as the problems of fuel supply and power supply at the start of the engine are concerned, there no disclosure except that the engine is equipped with a small battery which consumers only a small amount of electric power and can be charged by the use of part of electric power generated by a flywheel magneto.

Further, concerning the above problems, Japanese Provisional Patent Publication (Kokai) No. 63-170541 discloses the use of a battery having a small capacity, such as a dry cell, for starting a batteryless engine.

Also, Japanese Provisional Patent Publication (Kokai) No. 63-259127 discloses the technique of metering fuel by a device operated by intake vacuum.

Thus, the above prior art publications concerning the electronically-controlled fuel injection system having no conventionally-used battery merely disclose respective techniques which are not related to each other, and no disclosure has been made as to how to combine these separately-proposed individual techniques. More specifically, no disclosure has been made as to relationships between the starting operation of the engine, and fuel supply operation and timing therefor, or relationships between ignition, operation of fuel injection valves, and power supply, etc.

SUMMARY OF THE INVENTION

It is an object of the invention to provide an electronically-controlled fuel injection system which is capable of reliably starting an engine without using a battery or a dry cell.

It is a further object of the invention to provide an internal combustion engine which is equipped with a generator for supplying electric power to both an electronically-controlled fuel injection system and an ignition system in such a manner that a supply voltage to one of the two systems is not affected by fluctuations in a supply voltage to the other system to thereby enable to operate the systems in an efficient and stable manner.

To attain the first-mentioned object, according to a first aspect of the invention, there is provided a fuel injection system for an internal combustion engine including a recoil starter, a flywheel rotatable by operation of the recoil starter, an ignition device, and an intake passage.

The fuel injection system according to the first aspect of the invention is characterized by comprising:

at least one fuel injection valve for supplying fuel into the intake passage;

control means responsive to operating conditions of the engine for controlling a time period over which the fuel injection valve is opened and timing for opening the fuel injection valve;

generator means responsive to rotation of said flywheel for generating electric power, the generator means being connected to the ignition device and the control means and forming power supplies for driving the ignition device and the control means;

a fuel pump arranged to be driven in unison with the flywheel by torque transmitted from the flywheel; and a pressure regulator for controlling pressure of fuel supplied from the fuel pump to the fuel injection valve.

Preferably, the generator means comprises first and second power generating systems responsive to rotation of the flywheel for generating electric power, the first and second power generating systems being provided independently of each other, one of the first and second power generating systems forming a power supply for driving the ignition device, and the other power generating system forming a power supply for driving the control means. More preferably, the power supply for driving the control means comprises at least one first magnet mounted on an inner periphery of the flywheel, a stator core, and a plurality of windings wound on the stator core and disposed to face the first magnet during rotation of the flywheel.

Also preferably, the power supply for driving the ignition device comprises at least one second magnet mounted on an outer periphery of the flywheel, and an ignition device unit disposed to face the second magnet during rotation of the flywheel.

To attain the second-mentioned object, according to a second aspect of the invention, there is provided an internal combustion engine comprising:

a recoil starter;

a flywheel rotatable by operation of the recoil starter;

an ignition device:

an intake passage;

at least one fuel injection valve for supplying fuel into the intake passage;

control means responsive to operating conditions of the engine for controlling a time period over which the fuel injection valve is opened and timing for opening the fuel injection valve;

generator means responsive to rotation of the flywheel for generating electric power, the generator means being connected to the ignition device and the control means and forming power supplies for driving the ignition device and the control means;

a fuel pump arranged to be driven in unison with the flywheel by torque transmitted from the flywheel; and a pressure regulator for controlling pressure of fuel supplied from said fuel pump to said fuel injection valve.

Preferably, the generator means comprises first and second power generating systems responsive to rotation of the flywheel for generating electric power, the first and second power generating systems being provided independently of each other, one of the first and second power generating systems forming a power supply for driving the ignition device, and the other power generating system forming a power supply for driving the control means.

More preferably, the power supply for driving the control means comprises at least one first magnet mounted on an inner periphery of the flywheel, a stator core, and a plurality of windings wound on the stator core and disposed to face the first magnet during rotation of the flywheel.

Also preferably, the power supply for driving the ignition device comprises at least one second magnet mounted on an outer periphery of the flywheel, and an ignition device unit disposed to face the second magnet during rotation of the flywheel.

The above and other objects, features, and advantages of the invention will become more apparent from the ensuing detailed description taken in conjunction with the accompanying drawings.

DETAILED DESCRIPTION

The invention will now be described in detail with reference to the drawings showing an embodiment thereof.

Figure 1:
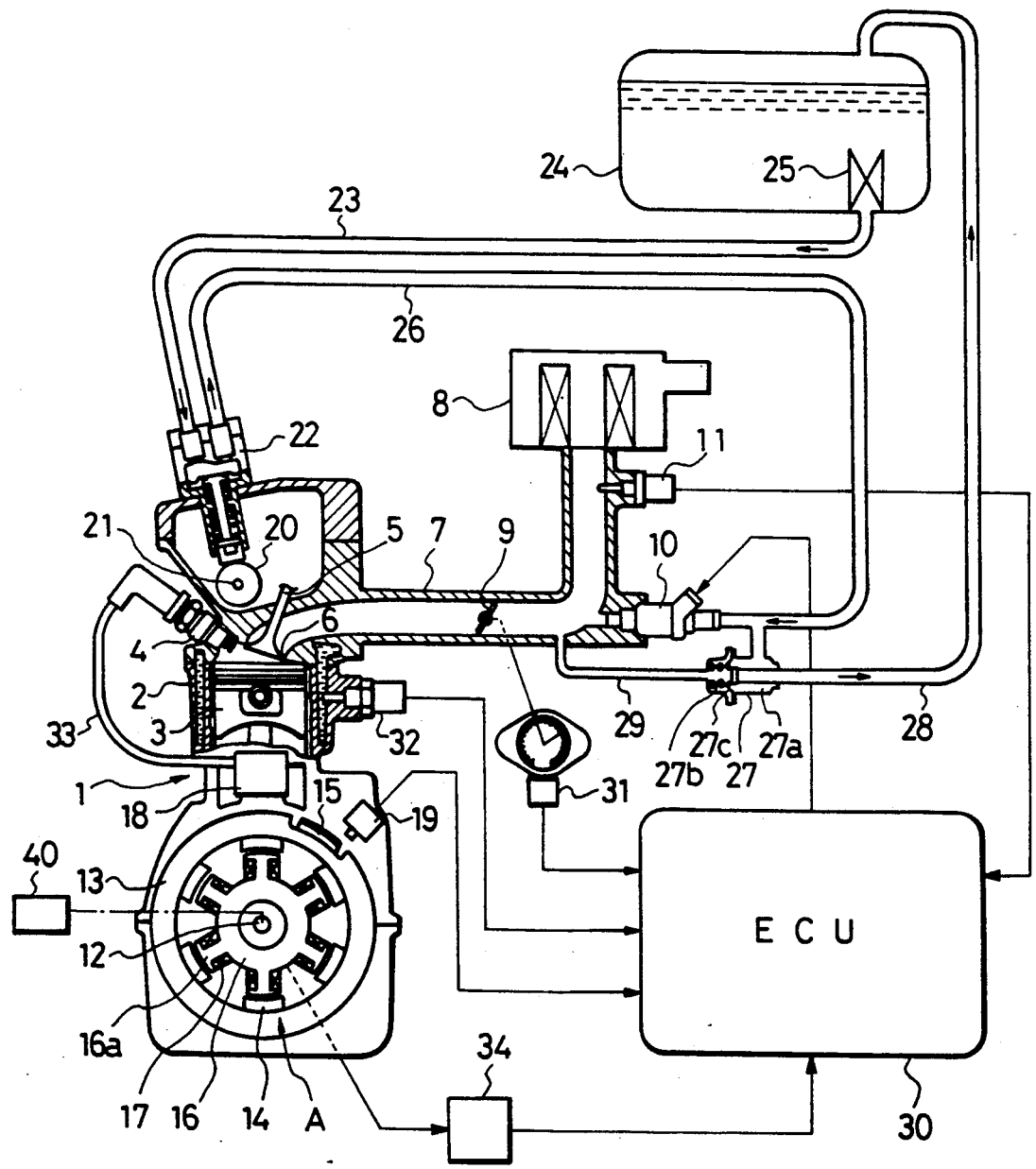
FIG. 1 is a schematic diagram showing the arrangement of an internal combustion engine and a control system therefor according to an embodiment of the invention.

FIG. 1 shows the arrangement of an internal combustion engine and a control system therefor according to an embodiment of the invention. An engine 1 has at least one cylinder 2, in which are arranged a piston 3 and a spark plug 4. An intake valve 5 is arranged in an intake port 6 which opens into an upper portion of the cylinder 2. The intake port 6 is communicated with the atmosphere via an intake pipe 7 and an air cleaner 8. A throttle valve 9 is arranged in the intake pipe 7, and a fuel injection valve 10 and an intake air temperature sensor 11 for detecting intake air temperature are arranged in the intake pipe at respective locations upstream of the throttle valve 9. The fuel injection valve 10 injects fuel into the intake pipe 7 at a location upstream of the throttle valve 9.

A flywheel 13 is rigidly fixed to a crankshaft 12 of the engine 1. An AC generator A comprises the flywheel 13 as a rotor having six first magnets 14 and one second magnet 15 which are mounted on the inner periperal surface and outer peripheral surface of the flywheel 13, respectively, a stator core 16 having six projections 16a disposed to face the first magnets 14, and windings 17 wound around the respective projections 16a. The first magnets 14, the stator core 16, and the windings 17 of the generator A form a power supply unit for driving the fuel injection valve 10. An ignition device unit 18 having a built-in ignition coil, not shown, and a crank angle sensor 19 are disposed such that they can be brought into facing relation to the second magnet 15. The ignition coil of the ignition device unit 18 is electrically connected to the spark plug 4 via a wire 33. In the present embodiment, the ignition device unit 18 is formed of a conventional self-triggering type ignition device such as ones described in U.S. Pat. No. 3,878,452, and Japanese Patent Publication (Kokoku) No. 57-27310.

Figure 2:
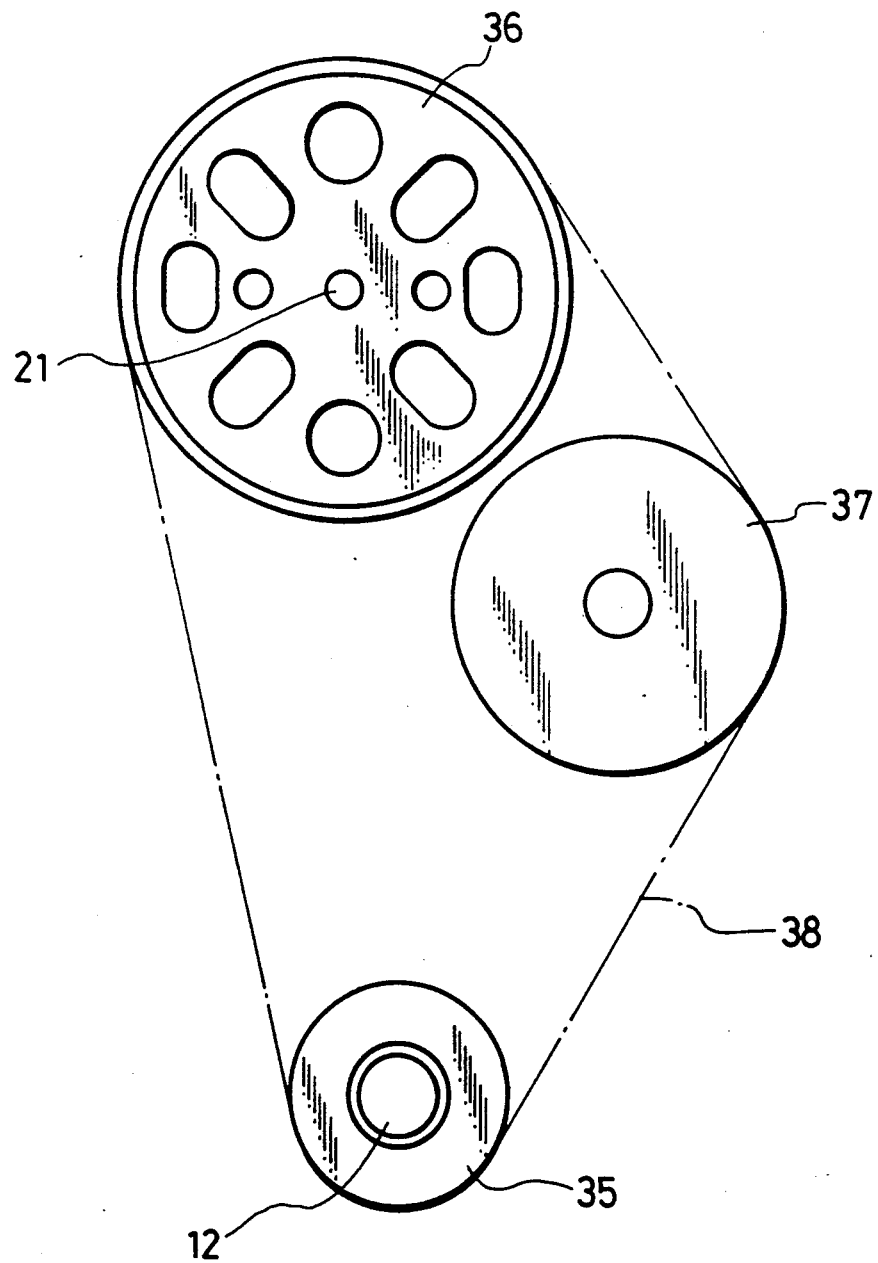
FIG. 2 is a view useful in explaining a mechanism for transmitting the torque of a crankshaft to a camshaft.

Arranged above the cylinder 2 are a fuel pump 22 for pressurizing fuel to be supplied to the fuel injection valve 10, and a cam 20 for driving the fuel pump 22. A cam pulley 36 is rigidly mounted on a cam shaft in which the cam 20 is secured, as shown in FIG. 2. A timing belt 38 is engaged over the cam pulley 36 and a crankshaft pulley 35 rigidly mounted on the crankshaft 12 for driving the former by the latter. Further, in the present embodiment, a water pump pulley 37 for driving a water pump, not shown, is rotatively driven by the crankshaft pulley via the timing belt 38. Thus, with rotation of the crankshaft 12, the water pump and the fuel pump 22 are driven.

The fuel pump 22 is connected to a fuel tank 24 via a conduit 23, and also to the fuel injection valve 10 and a pressure regulator 27 via a conduit 26. A fuel filter 25 is disposed in the fuel tank 24 such that it covers an open end of the conduit 23 which opens into the fuel tank 24. Fuel in the fuel tank 24 is supplied to the fuel pump 22 via the fuel filter 25 and the conduit 23. Pressurized fuel from the fuel pump 22 is supplied via the conduit 26 to the fuel injection valve 10. The pressure regulator 27 comprises a negative pressure chamber 27b, a fuel chamber 27a, and a diaphragm 27c having a valve body, which separates the negative pressure chamber 27b and the fuel chamber 27a from each other. Connected to the fuel chamber 27a are the conduit 26 and a conduit 28 connected to the fuel tank 24. On the other hand, the negative pressure chamber 27b is connected to a portion of the intake pipe 7 in the vicinity of a nozzle of the fuel injection valve 10 via a conduit 29. Thus, the pressure regulator 27 operates to return a portion of fuel supplied from the fuel pump 22 to the fuel tank 24 in response to negative pressure prevailing in the vicinity of the nozzle of the fuel injection valve 10 to thereby regulate the pressure of fuel supplied to the fuel injection valve 10.

The windings 17 of the AC generator A are electrically connected to a power supply circuit 34 for rectifying, smoothing and stabilizing output voltage from the AC generator A. The power supply circuit 34 supplies supply voltage to an electronic control unit (hereinafter referred to as "the ECU") 30.

Further, there are provided a throttle valve opening sensor 31 for detecting the opening of the throttle valve 9 and an engine coolant temperature sensor 32 for detecting the temperature of an engine coolant circulating through the walls of the cylinder 2. Output signals from the sensors 31 and 32 are supplied to the ECU 30 together with output signals from the intake air temperature sensor 11 and the crank angle sensor 19.

The ECU 30 controls the timing for opening the fuel injection valve 10 and the duration over which the fuel injection valve 10 is opened, by generating a signal for driving the fuel injection valve 10 to open same, to thereby allow fuel to be injected into the intake pipe 7.

Further, a recoil starter 40 for directly rotating the crankshaft 12 by manual operation at the start of the engine is mounted on an end of the flywheel 13 which is exposed to the outside of the engine unit. The recoil starter 40 may be of such a known type as described in U.S. Pat. Nos. 2,692,589, 2,742,887, and 3,465,740.

The operation of the engine and the control system therefor having the above-described construction will be described below.

When the recoil starter 40 is manually operated to rotate the crankshaft 12, the torque of the crankshaft 12 is transmitted via the crankshaft pully 35, timing belt 38, cam pulley 36, cam shaft 21 to the cam 20 to rotate same. As a result, almost simultaneously with manual operation of the recoil starter 40, the fuel pump 22 starts to pressurize fuel to be supplied to the fuel injection valve 10. Therefore, supply of fuel is not delayed as in the prior art case where intake negative pressure is utilized. Further, simultaneously with the manual operation of the recoil starter 40, the flywheel 13 is rotated together with rotating of the crankshaft 12 so that voltage is generated across the windings by rotation of the flywheel 13, whereby the generated voltage is supplied to the ECU 30 via the power supply circuit 34. At the same time, voltage is generated across the ignition coil of the ignition device unit 18, which is supplied to the spark plug 4 to drive same.

As described above, immediately upon manual operation of the recoil starter 40, the fuel pressure can be increased to a sufficient level for operation of the fuel injection valve 10, by immediate starting of the fuel pump 22 interlocked with the recoil starter 40, and at the same time the ECU 30 becomes ready to supply driving signals to the fuel injection valve 10 and the spark plug 4. This enables to start the engine reliably and easily even within a relatively short time period during which the flywheel 13 rotates by inertia.

Further, the system comprising the first magnets 14 and the windings 17 for obtaining generator power for driving the fuel injection valve 10, and the system comprising the second magnet 15 and the ignition device unit 18 for obtaining generator power for driving the spark plug 4, are provided separately from each other, so that large fluctuations in the supply voltage for driving the spark plug 4 which occur whenever the spark plug is ignited do not directly affect the supply voltage for driving the fuel injection valve 10, and hence there is no mutual interference between the supply voltages for driving the fuel injection valve 10 and the spark plug 4. This makes it possible to efficiently and stably operate the fuel injection valve 10 and the spark plug 4 by relatively small energy or electric power obtained from kinetic energy of inertial rotation of the flywheel 13.

What is claimed is:

1. An electronically-controlled fuel injection system with no battery for an internal combustion engine including a recoil starter, a flywheel fixed to an output shaft of said engine for rotation therewith and rotatable by operation of said recoil starter, an ignition device, and an intake passage, said fuel injection system comprising:

at least one fuel injection valve for supplying fuel into said intake passage;

control means responsive to operating conditions of said engine for controlling a time period over which said fuel injection valve is opened and timing for opening said fuel injection valve;

generator means provided integrally on said flywheel and responsive to rotation of said flywheel for generating electric power, said generator means being connected to said ignition device and said control means and forming power supplies for driving said ignition device and said control means;

a fuel pump arranged to be driven in unison with said flywheel by torque transmitted from said flywheel for pressurizing fuel supplied to said fuel injection valve; and a pressure regulator for controlling pressure of fuel supplied from said fuel pump to said fuel injection valve.

2. An electronically-controlled fuel injection system with no battery according to claim 1, wherein said generator means comprises first and second power generating systems responsive to rotation of said flywheel for generating electric power, said first and second power generating systems being provided independently of each other, one of said first and second power generating systems forming a power supply for driving said ignition device, and the other power generating system forming a power supply for driving said control means.

3. An electronically-controlled fuel injection system with no battery according to claim 2, wherein said power supply for driving said control means comprises at least one first magnet mounted on an inner periphery of said flywheel, a stator core, and a plurality of windings wound on said stator core and disposed to face said first magnet during rotation of said flywheel.

4. An electronically-controlled fuel injection system with no battery according to claim 2 or 3, wherein said power supply for driving said ignition device comprises at least one second magnet mounted on an outer periphery of said flywheel, and an ignition device unit disposed to face said second magnet during rotation of said flywheel.

5. An internal combustion engine comprising:

a recoil starter;

a flywheel fixed to an output shaft of said engine for rotation therewith and rotatable by operation of said recoil starter;

an ignition device;

an intake passage;

at least one fuel injection valve for supplying fuel into said intake passage;

electronic control means with no battery and responsive to operating conditions of said engine for controlling a time period over which said fuel injection valve is opened and timing for opening said fuel injection valve;

generator means provided integrally on said flywheel and responsive to rotation of said flywheel for generating electric power, said generator means being connected to said ignition device and said control means and forming power supplies for driving said ignition device and said control means;

a fuel pump arranged to be driven in unison with said flywheel by torque transmitted from said flywheel for pressurizing fuel supplied to said fuel injection valve; and a pressure regulator for controlling pressure of fuel supplied from said fuel pump to said fuel injection valve.

6. An internal combustion engine according to claim 5, wherein said generator means comprises first and second power generating systems responsive to rotation of said flywheel for generating electric power, said first and second power generating systems being provided independently of each other, one of said first and second power generating systems forming a power supply for driving said ignition device, and the other power generating system forming a power supply for driving said control means.

7. An internal combustion engine according to claim 6, wherein said power supply for driving said control means 7 comprises at least one first magnet mounted on an inner periphery of said flywheel, a stator core, and a plurality of windings wound on said stator core and disposed to face said first magnet during rotation of said flywheel.

8. An internal combustion engine according to claim 6 or 7, wherein said power supply for driving said ignition device comprises at least one second magnet mounted on an outer periphery of said flywheel, and an ignition device unit disposed to face said second magnet during rotation of said flywheel.

* * * * *